United States Patent
Macaulay

(10) Patent No.: US 7,017,950 B2
(45) Date of Patent: Mar. 28, 2006

(54) EXPANDABLE CONNECTION

(75) Inventor: Iain Cameron Macaulay, Aberdeen (GB)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 10/670,133

(22) Filed: Sep. 24, 2003

(65) Prior Publication Data

US 2004/0113428 A1   Jun. 17, 2004

(30) Foreign Application Priority Data

Sep. 25, 2002   (GB) .................................. 0222321

(51) Int. Cl.
*F16L 25/00* (2006.01)
(52) U.S. Cl. .................. 285/334; 285/333; 285/334.4
(58) Field of Classification Search ................ 285/333, 285/334, 334.4

See application file for complete search history.

(56) References Cited

U.S. PATENT DOCUMENTS

| | | | |
|---|---|---|---|
| 268,868 A | 12/1882 | Collins | |
| 782,349 A | 2/1905 | Marshall | |
| 1,678,640 A | 7/1928 | Hall | |
| 1,820,644 A | 8/1931 | Bach | |
| 2,155,370 A | 4/1939 | Hall et al. | |
| 2,217,370 A | 10/1940 | Johnston | |
| 2,226,804 A | 12/1940 | Carroll | |
| 2,341,670 A | 2/1944 | Stinson | |
| 2,407,552 A | 9/1946 | Hoesel | |
| 2,751,238 A | 6/1956 | Vegren | |
| 2,858,894 A | 11/1958 | Akeyson | |
| 2,873,985 A | 2/1959 | Baldwin, Jr. | |
| 2,898,136 A | 8/1959 | Hall, Sr. et al. | |
| 3,062,568 A | 11/1962 | Andresen et al. | |
| 3,105,556 A | 10/1963 | Raulins | |
| 3,353,599 A | 11/1967 | Swift | |
| 3,419,079 A | 12/1968 | Current | |
| 3,759,553 A | 9/1973 | Carter | |
| 3,766,991 A | 10/1973 | Brown | |
| 3,851,983 A | 12/1974 | MacKenzie | |
| 3,855,126 A | 12/1974 | Smith | |

(Continued)

FOREIGN PATENT DOCUMENTS

DE       3413792       11/1985

(Continued)

OTHER PUBLICATIONS

U.S. Appl. No. 10/741,418, filed Dec. 19, 2003, Harrall.

(Continued)

*Primary Examiner*—David Bochna
(74) *Attorney, Agent, or Firm*—Patterson & Sheridan

(57) ABSTRACT

An expandable tubular coupling comprises a threaded male portion and a corresponding threaded female portion, wherein the thread portions feature thread profiles configured such that the coupling may be made up to a predetermined extent, and once made up to the predetermined extent be made up no further. In a disclosed embodiment the thread profiles are a combination of a square thread profile and dovetail thread profile.

6 Claims, 3 Drawing Sheets

U.S. PATENT DOCUMENTS

| | | | |
|---|---|---|---|
| 3,857,450 A | 12/1974 | Guier | |
| 3,913,687 A | 10/1975 | Gyongyosi et al. | |
| 3,989,284 A | 11/1976 | Blose | |
| 4,076,280 A | 2/1978 | Young | |
| 4,140,337 A | 2/1979 | Arcella et al. | |
| 4,281,858 A | 8/1981 | Bowyer | |
| 4,423,889 A | 1/1984 | Weise | |
| 4,449,596 A | 5/1984 | Boyadjieff | |
| 4,491,351 A | 1/1985 | Galle, Jr. et al. | |
| 4,550,937 A | 11/1985 | Duret | |
| 4,591,195 A | 5/1986 | Chelette et al. | |
| 4,601,492 A | 7/1986 | George | |
| 4,611,838 A | 9/1986 | Heilmann et al. | |
| 4,619,472 A | 10/1986 | Kozono et al. | |
| 4,625,796 A | 12/1986 | Boyadjieff | |
| 4,659,119 A | 4/1987 | Reimert | |
| 4,703,959 A | 11/1987 | Reeves et al. | |
| 4,711,474 A | 12/1987 | Patrick | |
| 4,712,955 A | 12/1987 | Reece et al. | |
| 4,753,460 A | 6/1988 | Tung | |
| 4,754,807 A | 7/1988 | Lange | |
| 4,771,829 A | 9/1988 | Sparlin | |
| 4,778,008 A | 10/1988 | Gonzalez et al. | |
| 4,786,090 A | 11/1988 | Mott | |
| 4,793,422 A | 12/1988 | Krasnov | |
| 4,813,493 A | 3/1989 | Shaw et al. | |
| 4,822,081 A | 4/1989 | Blose | |
| 4,878,546 A | 11/1989 | Shaw et al. | |
| 4,892,337 A | 1/1990 | Gunderson et al. | |
| 4,917,409 A | 4/1990 | Reeves | |
| 4,985,975 A | 1/1991 | Austin et al. | |
| 5,015,017 A | 5/1991 | Geary | |
| 5,048,871 A | 9/1991 | Pfeiffer et al. | |
| 5,069,761 A | 12/1991 | Krings et al. | |
| 5,098,241 A | 3/1992 | Aldridge et al. | |
| 5,181,570 A | 1/1993 | Allwin et al. | |
| 5,251,709 A | 10/1993 | Richardson | |
| 5,339,895 A | 8/1994 | Arterbury et al. | |
| 5,348,095 A | 9/1994 | Worrall et al. | |
| 5,350,202 A | 9/1994 | Fritz et al. | |
| 5,360,240 A | 11/1994 | Mott | |
| 5,366,012 A | 11/1994 | Lohbeck | |
| 5,388,651 A | 2/1995 | Berry | |
| 5,415,442 A | 5/1995 | Klementich | |
| 5,480,196 A | 1/1996 | Adams, Jr. | |
| 5,518,072 A | 5/1996 | McTernaghan | |
| 5,520,422 A | 5/1996 | Friedrich et al. | |
| 5,667,011 A | 9/1997 | Gill et al. | |
| 5,743,333 A | 4/1998 | Willauer et al. | |
| 5,782,503 A | 7/1998 | Noel et al. | |
| 5,787,980 A | 8/1998 | Sparlin et al. | |
| 5,810,401 A | 9/1998 | Mosing et al. | |
| 5,855,242 A | 1/1999 | Johnson | |
| 5,901,789 A | 5/1999 | Donnelly et al. | |
| 5,906,398 A | 5/1999 | Larsen et al. | |
| 5,924,745 A | 7/1999 | Campbell | |
| 5,971,443 A | 10/1999 | Noel et al. | |
| 5,984,568 A | 11/1999 | Lohbeck | |
| 6,012,522 A | 1/2000 | Donnelly et al. | |
| 6,109,349 A | 8/2000 | Simone et al. | |
| 6,142,230 A | 11/2000 | Smalley et al. | |
| 6,158,507 A | 12/2000 | Rouse et al. | |
| 6,158,785 A | 12/2000 | Beaulier et al. | |
| 6,189,619 B1 | 2/2001 | Wyatt et al. | |
| 6,203,766 B1 | 3/2001 | Kawakami et al. | |
| 6,206,436 B1 * | 3/2001 | Mallis | 285/334 |
| 6,270,127 B1 | 8/2001 | Enderle | |
| 6,273,634 B1 | 8/2001 | Lohbeck | |
| 6,315,040 B1 | 11/2001 | Donnelly | |
| 6,322,109 B1 | 11/2001 | Campbell et al. | |
| 6,322,110 B1 | 11/2001 | Banker et al. | |
| 6,325,424 B1 | 12/2001 | Metcalfe et al. | |
| 6,343,813 B1 | 2/2002 | Olson et al. | |
| 6,409,175 B1 | 6/2002 | Evans et al. | |
| 6,454,013 B1 | 9/2002 | Metcalfe | |
| 6,457,532 B1 | 10/2002 | Simpson | |
| 6,457,537 B1 | 10/2002 | Mercer et al. | |
| 6,481,760 B1 | 11/2002 | Noel et al. | |
| 6,543,816 B1 | 4/2003 | Noel | |
| 6,550,821 B1 * | 4/2003 | DeLange et al. | 285/333 |
| 6,554,287 B1 * | 4/2003 | Sivley et al. | 285/333 |
| 6,581,980 B1 | 6/2003 | DeLange et al. | |
| 6,607,220 B1 * | 8/2003 | Sivley, IV | 285/334 |
| 6,619,696 B1 | 9/2003 | Baugh et al. | |
| 6,622,797 B1 | 9/2003 | Sivley, IV | |
| 6,648,071 B1 | 11/2003 | Hackworth et al. | |
| 6,685,236 B1 | 2/2004 | Setterberg, Jr. | |
| 6,708,767 B1 | 3/2004 | Harrall et al. | |
| 6,722,443 B1 | 4/2004 | Metcalfe | |
| 6,767,035 B1 | 7/2004 | Hashem | |
| 6,789,822 B1 * | 9/2004 | Metcalfe | 285/333 |
| 2001/0038206 A1 | 11/2001 | Olechnowicz et al. | |
| 2002/0027363 A1 | 3/2002 | Mallis et al. | |
| 2002/0070031 A1 | 6/2002 | Voll et al. | |
| 2002/0079106 A1 | 6/2002 | Simpson | |
| 2002/0163192 A1 | 11/2002 | Coulon et al. | |
| 2003/0024708 A1 | 2/2003 | Ring et al. | |
| 2003/0029621 A1 | 2/2003 | Haynes | |
| 2003/0067166 A1 | 4/2003 | Sivley, IV | |
| 2003/0067169 A1 | 4/2003 | Church | |
| 2003/0075338 A1 | 4/2003 | Sivley, IV | |
| 2003/0168858 A1 | 9/2003 | Hashem | |
| 2003/0168859 A1 | 9/2003 | Watts | |
| 2003/0234538 A1 | 12/2003 | Hashem | |
| 2004/0017081 A1 | 1/2004 | Simpson et al. | |
| 2004/0055759 A1 | 3/2004 | Sivley, IV | |
| 2004/0104575 A1 | 6/2004 | Ellington et al. | |
| 2004/0108119 A1 | 6/2004 | Maguire et al. | |
| 2004/0113428 A1 | 6/2004 | Macaulay | |
| 2004/0135370 A1 | 7/2004 | Evans et al. | |
| 2004/0145184 A1 | 7/2004 | Setterberg, Jr. | |
| 2004/0194966 A1 | 10/2004 | Zimmerman | |
| 2004/0194968 A1 | 10/2004 | Metcalfe | |
| 2004/0231839 A1 | 11/2004 | Ellington et al. | |
| 2005/0023001 A1 | 2/2005 | Hillis | |

FOREIGN PATENT DOCUMENTS

| | | |
|---|---|---|
| EP | 0171144 | 2/1986 |
| EP | 0447346 | 9/1991 |
| EP | 0 659 975 | 6/1995 |
| EP | 0 803 637 | 10/1997 |
| EP | 1 106 778 | 6/2001 |
| FR | 2 742 177 | 6/1997 |
| GB | 706342 | 3/1954 |
| GB | 1037010 | 7/1966 |
| GB | 2 033 942 | 5/1980 |
| GB | 2 099 529 | 12/1982 |
| GB | 2 161 569 | 1/1986 |
| GB | 2 371 574 | 7/2002 |
| JP | 2002-286183 | 10/2002 |
| WO | WO 90/11455 | 10/1990 |
| WO | WO 93/12323 | 6/1993 |
| WO | WO 93/25800 | 12/1993 |
| WO | WO 96/37680 | 11/1996 |
| WO | WO 96/37681 | 11/1996 |
| WO | WO 96/37687 | 11/1996 |
| WO | WO 97/17524 | 5/1997 |
| WO | WO 97/21901 | 6/1997 |
| WO | WO 98/22690 | 5/1998 |
| WO | WO 98/32948 | 7/1998 |
| WO | WO 98/42947 | 10/1998 |
| WO | WO 98/47805 | 10/1998 |

| WO | WO 00/08301 | 2/2000 |
| WO | WO 00/37766 | 6/2000 |
| WO | WO 01/60545 | 8/2001 |
| WO | WO 02/10551 | 2/2002 |
| WO | WO 02/059458 | 8/2002 |
| WO | WO 02/075197 | 9/2002 |
| WO | WO 03/006788 | 1/2003 |
| WO | WO 03/032331 | 4/2003 |
| WO | WO 03/036012 | 5/2003 |
| WO | WO 03/036017 | 5/2003 |
| WO | WO 03/048503 | 6/2003 |
| WO | WO 03/048506 | 6/2003 |
| WO | WO 03/078882 | 9/2003 |

OTHER PUBLICATIONS

U.S. Appl. No. 10/940,485, filed Sep. 14, 2004, Metcalfe.

* cited by examiner

EXPANDABLE CONNECTION

BACKGROUND OF THE INVENTION

1. Field of the Invention

This invention relates to an expandable coupling, and in particular to an expandable threaded coupling for connecting expandable tubulars.

2. Description of the Related Art

The gas and oil exploration and production industry has recently begun to employ expandable downhole tubulars, for example in the form of diametrically expandable casing, liner and sand screens. A number of expansion methods have been proposed, including the use of rotary expansion tools and devices. The present applicant has developed a range of rotary expansion tools which feature rollers mounted on a body. Such a tool is rotated within the tubular to be expanded, with the rollers in rolling contact with the inner wall of the tubular. The rollers are arranged to reduce the wall thickness of the tubular by cold work, with a corresponding increase in the tubular diameter.

The majority of downhole tubular strings comprise a number of threaded sections which are coupled together at surface to a desired torque. Typically, each section will feature a leading threaded male portion, or pin, and a threaded female portion, or box, on the other end such that a coupling between two adjacent sections features a threaded pin extending into a corresponding threaded box. Such couplings tend to operate satisfactorily on conventional applications, where the coupling is not subject to expansion. However, expansion of tubular strings including such couplings is problematic. One difficulty that may be encountered is that if a string of tubulars is expanded, for example by using a rotary expansion tool or a cone expansion tool or the like, the torque held in the couplings is released. Furthermore, where expansion is achieved using a rotary expansion tool, the tool applies a torque to the tubulars, such that in certain circumstances it is possible for rotary expansion of a coupling to result in backing-off of a threaded coupling, and thus compromise the integrity of the coupling, or even lead to separation of the coupling, and loss of the string below the coupling.

This has been addressed by ensuring that the thread configuration is compatible with the direction of rotation of the rotary expansion tool, such that the tool tends to tighten or torque-up the coupling as the tool passes into the lower tubular section which carries the box. However, the applicant has found that this tightening or torquing-up of couplings can, in certain circumstances, lead to other difficulties.

SUMMARY OF THE INVENTION

According to the present invention there is provided an expandable tubular coupling comprising:

a threaded male portion; and a corresponding threaded female portion, the threaded portions featuring thread profiles configured such that the coupling may be made up to a predetermined extent, and once made up to said predetermined extent may be made up no further.

The present invention thus differs from existing threaded couplings which may feature torque shoulders, or other arrangements, which limit the degree to which the coupling can be made up. In existing arrangements, following expansion of the coupling, it is often possible, and indeed it may sometimes be desirable, to make the coupling up further. This may not create any problems if the tubular string is free to rotate below the expansion tool. However, if a lower part of the string is held against rotation, for example by differential sticking, the rotation of a tubular section and the further making up of a coupling in an upper part of a string in a top-down rotary expansion may result in a corresponding degree of backing-off of a coupling in a lower part of the string. Even where there is only a limited degree of making-up at each coupling, for example one quarter of a turn, the rotation is cumulative as the string of tubular sections is expanded, such that the integrity of one or more lower couplings may be seriously compromised, or indeed a coupling may separate, with the loss of the string below the coupling.

By configuring the thread profiles of the coupling of the present invention to prevent the coupling from being made up further, this difficulty is avoided.

The thread profiles may take any appropriate form, and preferably each thread portion comprises first and second parts having different thread profiles. Each thread portion may have a leading part and a trailing part, when made-up the leading part of the male portion engaging the trailing part of the female portion, and the leading part of the female portion engaging the trailing part of the male portion. Most preferably, the male portion has a leading part with a thread profile corresponding to the thread profile of the trailing part of the female portion, and a trailing part with a thread profile corresponding to the thread profile of the leading part of the female portion, and the thread profiles are configured such that the thread portions may be made up until the start of the thread profile on the trailing part of the male portion encounters the start of the different thread profile on the trailing part of the female portion. The change in thread profiles between the first and second parts may be abrupt, but is preferably gradual or incremental.

Conveniently, the thread profiles may be a combination of a square thread profile and a dovetail thread profile. This allows each thread portion to be cut initially as a square thread, and then the flanks of a selected part of each thread portion to be cut with an angled cutting insert to create a dovetail profile. As such a coupling is being made up, the square profile cut in the leading part of the male portion will mate with and pass through the dovetail profile cut in the leading part of the female portion and of course will continue to pass through and mate with the square portion cut in the trailing part of the female position. However, the dovetail profile cut in the trailing part of the male portion will not mate with the square profile of the trailing part of the female portion, preventing any further rotation of the thread portions when different thread profiles meet, before or after expansion of the coupling.

Alternatively, the thread profiles may be a combination of similar form but different dimensioned thread profiles such as square thread profiles or dovetail profiles. With this arrangement a smaller thread profile is preferably located on the leading part of the male portion and is adapted to mate with a similarly dimensioned thread profile located on the trailing part of the female portion. Conveniently, a larger dimensioned thread profile is located on trailing and leading parts of the male and female portions respectively, which larger dimensioned thread profiles are engageable with each other but are not engageable with the smaller thread profiles, preventing any further rotation of the thread portions after the coupling has been made-up, before or after expansion of the coupling. The interface between the different dimensioned thread profiles may be abrupt or alternatively gradual or incremental.

The thread profiles may be parallel or tapered, left hand or right hand.

According to a second aspect of the present invention, there is provided a method of coupling tubulars, said method comprising the steps of:

providing a first tubular having a threaded male portion and a second tubular having a corresponding threaded female portion, wherein the threaded portions feature thread profiles configured such that the threaded portions may be made up to a predetermined extent, and once made up to said predetermined extent may be made up no further; and engaging the male and female threaded portions to form a tubular coupling made up to said predetermined extent.

The coupled tubulars may subsequently be expanded.

BRIEF DESCRIPTION OF THE DRAWINGS

These and other aspects of the present invention will now be described, by way of example only, with reference to the accompanying drawings, in which.

DETAILED DESCRIPTION OF THE PREFERRED EMBODIMENT

Figure 1:
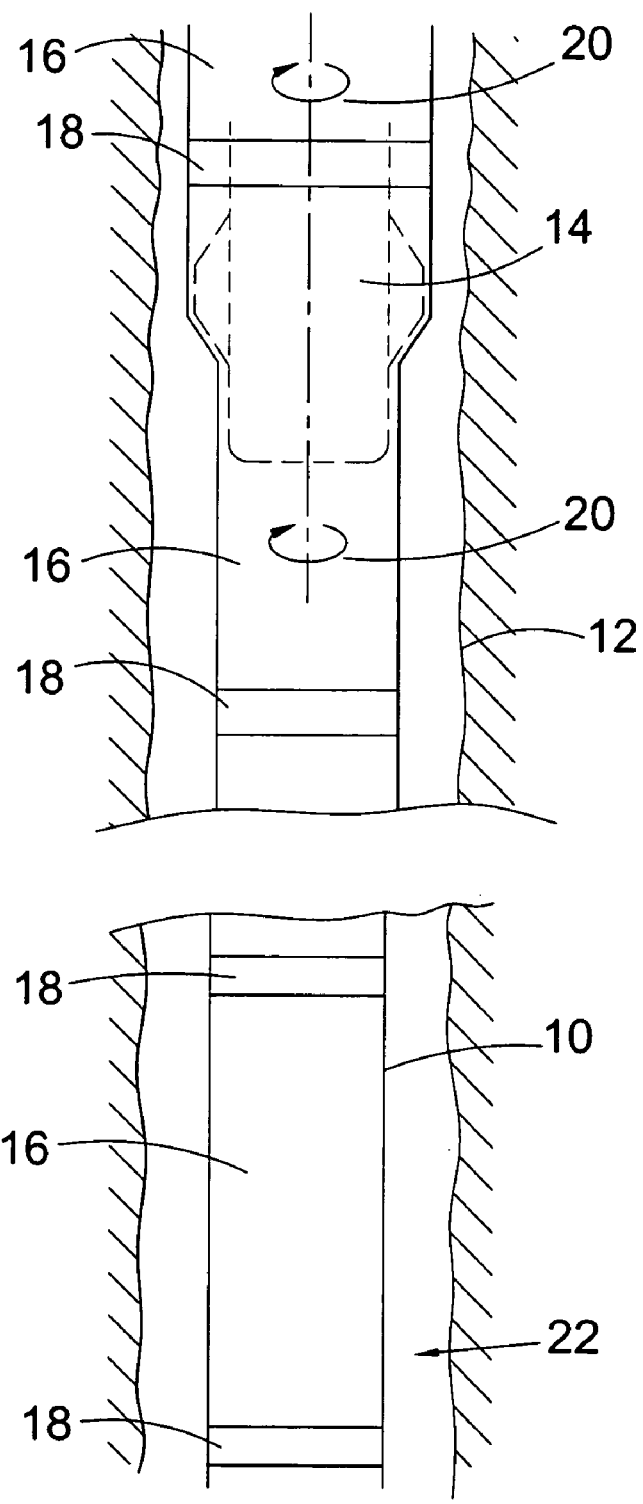
FIG. 1 is a cross-sectional view of a casing string being expanded in a borehole by a rotary expansion tool.

Reference is first made to FIG. 1 in which there is shown a cross-sectional view of a casing string 10 located in a bore 12 and being expanded, top-down, using a rotary expansion tool 14 (shown in broken outline). The casing string is composed of a number of casing tubular sections 16, connected together by use of threaded couplings 18, which in the embodiment shown are left handed threaded couplings. Although not apparent from FIG. 1, the threaded couplings are formed by engagement of a male threaded portion, or a pin connection, with a female threaded portion, or box connection. The pin connections are orientated in a downwards direction with respect to the bore 12, and the box connections are located in an upwards direction with respect to the bore 12. The engagement of the pin and box connections will be discussed in more detail hereinafter with reference to FIG. 2. However, for the meantime reference is still made to FIG. 1.

During top-down rotary expansion with the expansion tool 14 being rotated in a clockwise direction when viewed from above the tool 14, as indicated by arrows 20, the force exerted on the casing string 10 by the tool 14 will act to rotate the casing string 10 in a clockwise direction. When the tool 14 advances beyond a coupling 18 which has been expanded, the induced rotation of the casing 10 will act to further tighten or make-up the expanded coupling due to the fact that the casing tubulars located above the expanded coupling are rotatably fixed at the surface or head of the bore 12, and that the coupling 18 is a left handed coupling.

It should be noted that rotation may not create any problems if the casing string 10 is free to rotate below the expansion tool 14. However, if the string 10 is held against rotation at a lower portion 22 thereof, for example by differential sticking, the rotation of an upper tubular section 16 and the further making-up of an adjacent expanded coupling 18 may result in a corresponding backing-off of a coupling 18 in a lower part of the string 10. Even where there is only limited rotation at each coupling 18 following expansion, for example one quarter of a turn, the rotation is cumulative as the casing string 10 is expanded, such that the integrity of one or more lower couplings 18 may be seriously compromised, or indeed the degree of rotation may be sufficient to lead to separation of a coupling 18, and loss of the string 10 below that coupling 18.

Figure 2:
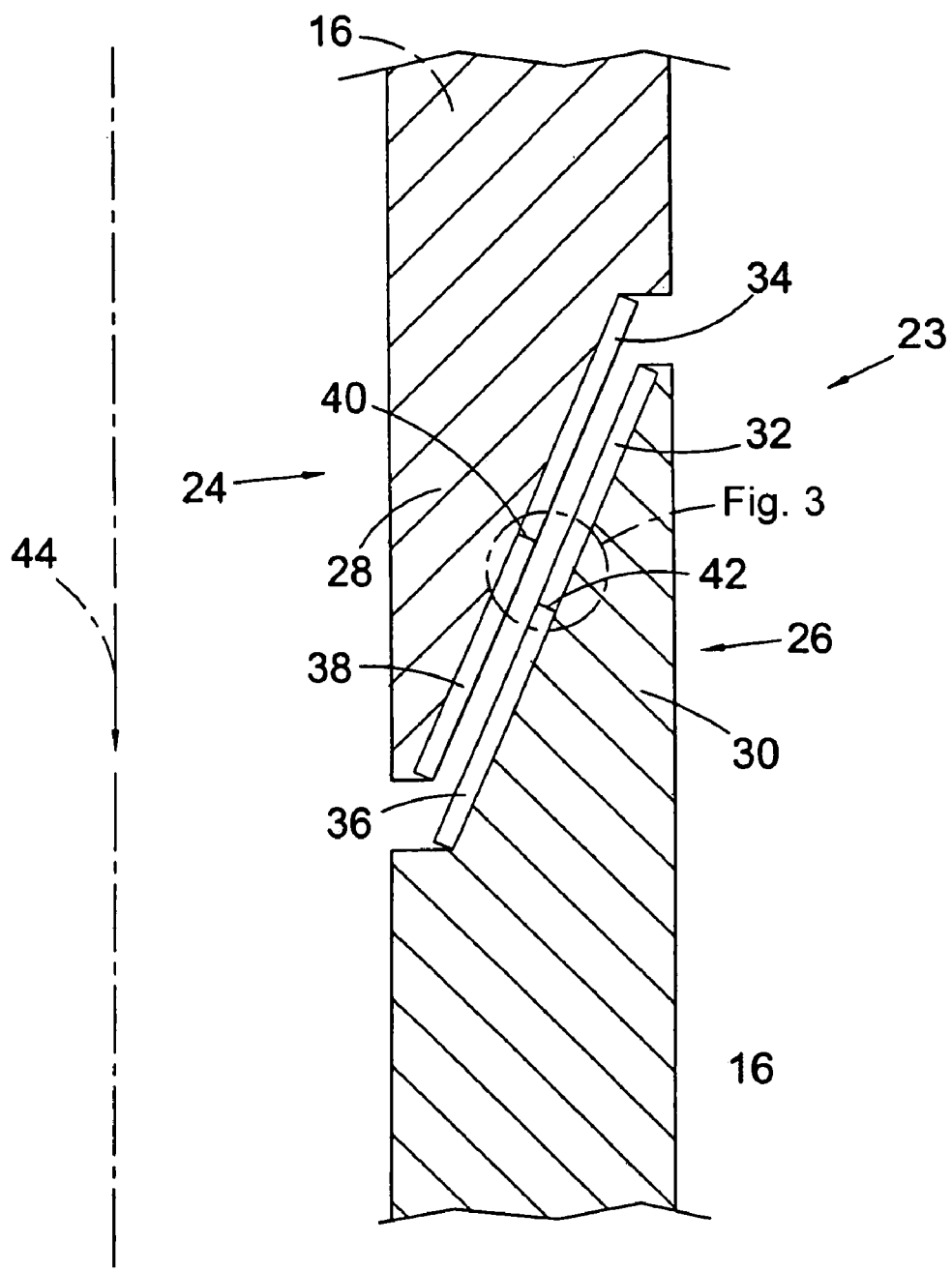
FIG. 2 is a schematic part sectional view of an expandable tubular coupling in accordance with an embodiment of the present invention.

Reference is now made to FIG. 2 in which there is shown a part sectional view of an expandable coupling 23 in accordance with an embodiment of the present invention, which coupling 23 is composed of the ends 24, 26 of two casing tubulars 16, wherein the end 24 of the upper tubular 16 includes a threaded pin connection 28, and the end 26 of the lower tubular 16 includes a threaded box connection 30. For clarity, the pin and box connections 28, 30 are shown separated.

The pin and box connections 28, 30 each include first and second threaded parts featuring different thread profiles. In the embodiment shown, the leading part of the box connection 30 features a dovetail thread profile 32 which corresponds to a dovetail thread profile 34 on a trailing part of the pin connection 28. Additionally, the trailing part of the box connection 30 features a square thread profile 36 which corresponds to a square thread profile 38 on a leading part of the pin connection 28.

To make up the coupling 23, the lower tubular carrying the box connection 30 is held stationary while the upper tubular carrying pin connection 28 is rotated relative thereto. The arrangement is such that the square thread profile 38 of the pin connection 28 can mate with both the dovetail thread profile 32 and the square thread profile 36 of the box connection 30, whereas the dovetail thread profile 34 of the pin connection 28 can only mate with the dovetail thread profile 32 of the box connection 30. Thus, the coupling 23 can only be made-up to the extent where the interface 40 between the different thread profiles 34, 38 of the pin connection 28 engage or abut the interface 42 between the different thread profiles 32, 36 of the box connection 30. Once the interfaces 40, 42 engage, no further tightening of the coupling 23 is possible. Thus, during top-down rotary expansion, that is, expansion in the direction of arrow 44, the reaction forces between the casing 10 and the rotary tool 14 (FIG. 1) will not further tighten or make-up the coupling 23, eliminating or at least reducing the possibility of loosening lower couplings, as discussed above.

Figure 3:
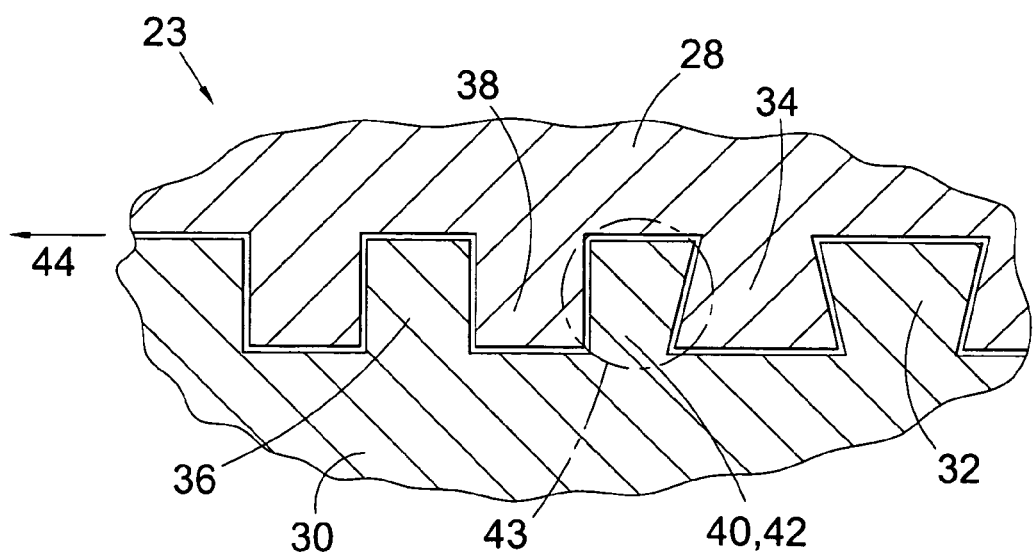
FIG. 3 is an enlarged sectional view of area 3 of the expandable tubular coupling of FIG. 2 showing the coupling engaged.

The coupling 23 will now be described further with reference to FIG. 3, in which there is shown a cross-sectional view of a portion of the coupling 23 of FIG. 2 in the region of the thread profile interfaces 40, 42. As shown, the leading portion of the pin connection 28 features a square thread profile 38 and the trailing portion a dovetail thread profile 34. Also, the leading portion of the box connection 30 features a dovetail thread profile 32 and the trailing portion includes a square thread profile 36. It is apparent from FIG. 3 that the dovetail thread profile 34 of the pin connection 28 will not mate with the square thread profile 36 of the box connection 30, and similarly, the dovetail thread profile 32 of the box connection 30 will not mate with the square thread profile 38 of the pin connection 28. This arrangement thus prevents the coupling 23 being tightened beyond the interfaces 40, 42, generally identified as area 43 in FIG. 3.

Figure 4:
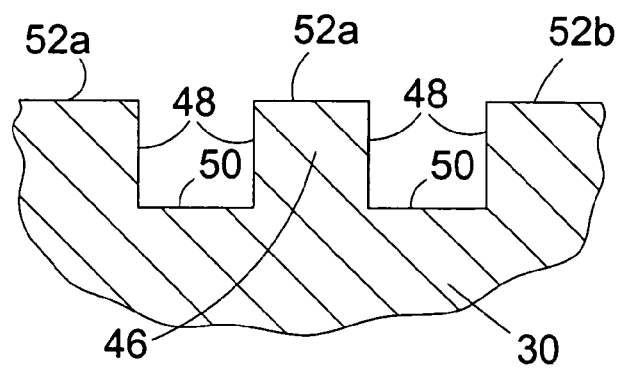
FIGS. 4 and 5 show part sectional views of a box connection used in the coupling of FIG. 2 in various stages of a thread forming process.
Figure 5:
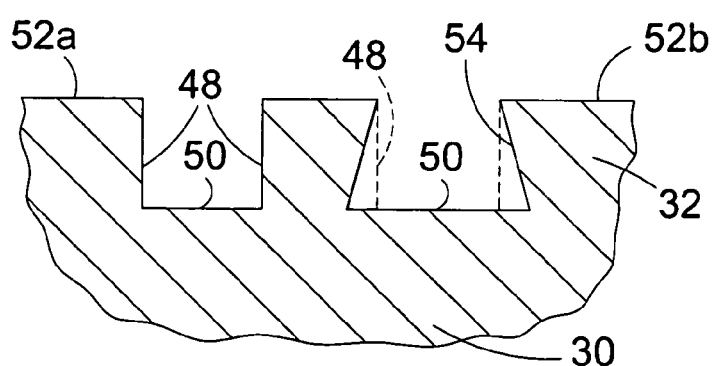

Reference is now made to FIGS. 4 and 5 in which there is shown a cross sectional view of a portion of a box connection 30 at various stages in a thread forming process. Referring initially to FIG. 4, a square thread profile 46 is cut along the entire thread portion of the box connection 30 by conventional means, wherein the thread 46 includes flanks 48 which are disposed perpendicularly between respective roots 50 and crests 52a and 52b of the thread 46. The subsequent stage, shown in FIG. 5, involves cutting the flanks 48 along the desired length of the box connection 30 to define new flanks 54 which are disposed at an acute angle with respect to the respective roots and crests 50, 52b. This process therefore produces the required dovetail thread profile 32. In order for the coupling 23 to function as desired, the crests 52b of the dovetail thread profiles 32 are larger than those of the square thread profile 46. This will ensure that the dovetail thread profile 32 of the box connection 30 will not mate with the square thread profile 38 (FIG. 3) of the pin connection 28 due to the incompatible configuration. Thus, the crests 52b of the square thread profile 46 shown in FIG. 4, that is, those crests which will subsequently form the crests of the dovetail thread profile, are larger than the remaining crests 52a of the thread profile. To achieve this, the square thread profile 46 is cut with a variable crest length.

The thread portion of the pin connection 28 may be formed in the same manner as described above.

The flanks 54 of the dovetail thread profile 32 are individually cut using an angled cutting insert, which requires the cutting insert to be passed along the length of the dovetail thread portion 32 twice, once for each flank. This arrangement, however, requires that the cutting insert has a width substantially equal to or less than the roots 50 of the square thread profile to facilitate removal of the cutting insert without the requirement of withdrawing the cutting insert along the entire length of the dovetail thread profile 32.

It should be noted that the embodiments hereinbefore described are merely exemplary of the present invention and that various alterations may be made thereto without departing from the scope of the invention. For example, the pin and box connections may be provided with thread portions having a similar form, differing only in their dimensions, such that a smaller male thread, for example, may mate with similar sized and larger female threads, but a larger sized male thread will be able to mate only with a similar sized female thread but not a smaller female thread. Additionally, the interface between the different thread profiles may be gradual or incremental. For example, there may be a transition surface between the different thread profiles or a step defining a shoulder between the thread profiles.

What is claimed is:

1. An expandable tubular coupling comprising:
   a threaded male portion; and
   a corresponding threaded female portion,
   the threaded portions featuring thread profiles configured such that the coupling may be made up to a predetermined extent, and once made up to said predetermined extent may be made up no further, each threaded portion comprising:
      a first part having a first thread profile, and
      a second part having a second thread profile, the first thread profile having a different shape than the second thread profile, wherein the thread profiles are a combination of a square thread profile and a dovetail thread profile.

2. An expandable tubular coupling as claimed in claim 1, wherein the square profile is provided on a leading part of the male portion and the dovetail profile is provided on a trailing part of the male portion.

3. An expandable tubular coupling as claimed in claim 1, wherein the square profile is provided on a trailing part of the female portion and the dovetail profile is provided on a leading part of the female portion.

4. An expandable tubular coupling as claimed in claim 3, wherein a square profile on a leading part of the male portion is adapted to mate with the dovetail profile on the leading part of the female portion.

5. The expandable tubular coupling as claimed in claim 1, wherein the change in thread profiles between the first part of the female portion and the second part of the female portion is gradual.

6. An expandable tubular coupling comprising:
   a threaded male portion; and
   a corresponding threaded female portion,
   the threaded portions featuring thread profiles configured such that the coupling may be made up to a predetermined extent, and once made up to said predetermined extent may be made up no further, wherein:
   the thread profiles am a combination of a square thread profile and a dovetail thread profile;
   the square profile is provided on a trailing part of the female portion and the dovetail profile is provided on a leading part of the female portion; and
   a dovetail profile on a trailing part of the male portion is configured so as not to mate with the square profile on the trailing part of the female portion.

* * * * *